May 3, 1966
L. R. CAPPEL ET AL
3,249,504
MULTIPLE UNIT TISSUE CULTURE PREPARATION
AND METHOD OF PREPARING SAME
Filed March 13, 1962
FIG. 1
FIG. 2
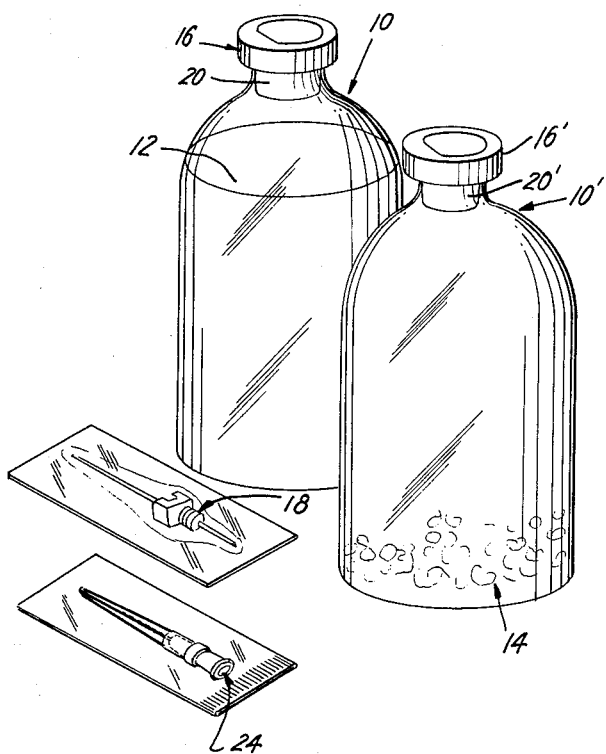
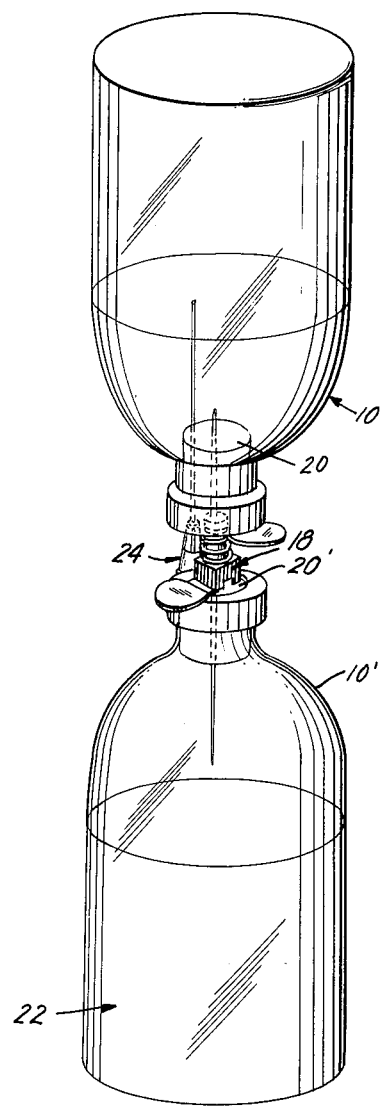
INVENTORS
NORMAN O. CAPPEL
LEONA R. CAPPEL
BY
Kane Dalsimer and Kane
ATTORNEYS 3,249,504
MULTIPLE UNIT TISSUE CULTURE PREPARATION AND METHOD OF PREPARING SAME
Leona R. Cappel and Norman O. Cappel, West Chester, Pa., assignors to Becton, Dickinson and Company, Rutherford, N.J., a corporation of New Jersey
Filed Mar. 13, 1962, Ser. No. 179,402
9 Claims. (Cl. 167—78)

This invention relates to an improved form of tissue culture medium and to a method of preparing the same, and more particularly to a multiple unit tissue culture medium.

Tissue culture media are formed from a plurality of components, many of which are labile and many of which are added in small and critical quantities, with the result that the preparation and storage of culture media present a number of problems.

One such problem is the rapid deterioration of a prepared culture medium resulting in loss of potency of the labile components after a period of from 24 to 48 hours, thus rendering the culture medium unusable for the growth of cells and tissues in vitro. For all practical purposes the culture medium should be used on the day prepared.

If stock solutions containing labile components are to be stored for future use, they must be refrigerated; and more particularly, if stock solutions containing glutamine, penicillin or streptomycin are to be stored for future use, they must be frozen due to their extremely labile nature, thus necessitating the use of expensive equipment for storing and maintaining such stock solutions.

Another difficulty in the preparation of culture media as used in the art today is the final adjustment of pH. The pH level is critical, and it is necessary to have a highly trained technician make the final adjustments, and the time required for such adjustments becomes an economic factor in the cost of the culture medium.

In the preparttion of a culture medium, sterile, non-toxic equipment must be used and aseptic techniques must be carefully followed to prevent contamination of the medium for the growth of cells and tissues in vitro. The initial cost of equipment necessary for a tissue culture laboratory is a major factor. The employment of skilled, highly trained and paid technicians to prepare a tissue culture medium is another major factor in the cost of operation. Finally, the successive use of stock solutions for the preparation of a tissue culture medium always presents the problem of contamination of the stock solution.

It is an object of the present invention to overcome the difficulties and disadvantages heretofore encountered and to provide an improved multiple unit tissue culture preparation which when mixed together is ready for use in the growth of cells and tissues in vitro or plastic ware or other suitable materials.

A further object is to provide an improved method of preparing a multiple unit tissue culture preparation.

Other objects include the provision of a culture medium preparation which has an extended shelf life at normal room temperatures and which may be further extended under normal refrigeration; which has a preadjusted pH, thereby eliminating the necessity of critical adjustment; which minimizes the danger of contamination; which results in culture media having a high degree of uniformity; which eliminates the necessity for maintaining stock culture solutions; and which reduces the cost of equipping, maintaining and operating tissue culture laboratories.

Other objects and advantages of the invention will become apparent from the following description and the appended claims.

Our invention comprises generally the provision of a tissue culture medium in a multiple-unit (preferably two-unit) form, in which the labile components, uniformly mixed together, are aseptically sealed in lyophilized form in one or more containers, and the stable components in the form of an aqueous solution or saline are aseptically sealed in one or more containers. The complete culture medium can be prepared or restored simply by mixing the components together.

In carrying out our invention, we select the labile components of the culture medium, mix them together in the proper sequence, observing proper techniques to avoid denaturing or otherwise adversely affecting the components, and then may add serum thereto, which among other things imparts additional protection to the labile components during subsequent processes. In preparing the mixture of labile components, the pH is maintained or adjusted within controlled limits of between 3 and 8, and preferably between 5 and 8. A final adjustment of the pH of the labile mixture may be necessary by the addition of Sodium Hydroxide solution of Hydrochloric Acid solution. If the mixture of labile components is to be used with a standard stable solution (e.g. Hanks' Balanced Salt Solution, Earle's Balanced Salt Solution), the pH of the mixture of labile components is adjusted so that after freeze-drying and reconstitution with the proper amount of stable solution, the final pH of the complete medium is between 6.8 and 7.6. The mixture of labile components is then sterilized by filtration. Filters that may be used include Selas, Seitz, Millipore, Fritted Glass or any other type of filter that is inert to the mixture and is capable of sterilizing the mixture.

When the mixture has been completed and is sterile, we freezo-dry it by standard lyophilizing procedures. The resulting lyophilized preparation is aseptically sealed, preferably under vacuum, or under certain circumstances in an inert atmosphere in a suitable container in which it can be subsequently restored. In this connection the lyophilized preparation thus packaged in a sealed container can be stored at room temperature for protracted periods of time up to one year or more, and it can be stored for an even longer period of time under refrigeration.

The stable components are mixed together in an aqueous solution, and the pH is adjusted or buffered so that the final pH when the stable and labile portions are mixed together becomes the proper pH. The adjusted or buffered solution compensates for the loss of volatiles, particularly Carbon Dioxide, during lyophilization of the labile components or any factor in the preparation of the labile components. The solution is sterilized by any suitable means before or after aliquoting in suitable containers. In preparing the mixture of stable components, the pH is maintained or adjusted within controlled limits of between 3 and 8, and preferably between 6 and 8. The resulting solution is sealed aseptically in a suitable container, and can be stored for indefinite periods of time.

To restore or prepare the tissue culture medium, it is necessary simply to aseptically add the solution of stable components to the lyophilized labile components and dissolve or disperse them therein. The medium thus prepared or restored can be used in the usual manner for the culturing of cells and tissues in vitro, nontoxic plastic ware or other suitable containers.

Our invention is applicable to various types of culture media, such as Morgan, Morton and Parker's Medium No. 199; Eagle's Media; and Melnick's Monkey Kidney "A" Medium.

The labile components which are mixed together and lyophilized generally comprise the amino acids, protein and other organic components of the culture medium, such as Arginine, Histidine, Lysine, Tyrosine, Tryptophan, Phenylalanine, Cystine, Methionine, Serine, Threonine, Leucine, Isoleucine, Valine, Glutamic Acid, Aspartic Acid, Alanine, Proline, Hydroxyproline, Glycine, Cysteine, Adenine, Guanine, Xanthine, Hypoxanthine, Thymine, Uracil, Thiamin, Riboflavin, Pyridoxine, Pyridoxal, Niacin, Niacinamide, Biotin, Folic Acid, Choline, Inositol, p-Aminobenzoic Acid, Vitamin A, Calciferol (Vit. D), Menadione (Vit. K), alpha-Tocopheryl Phosphate (Vit. E), Ascorbic Acid, Glutathione, Cholesterol, Adenosine Triphosphate, Adenylic Acid, Ribose, Tween 80 and serum protein.

The stable components which are prepared in the form of an aqueous solution generally comprise the inorganic materials, such as Sodium Chloride, Potassium Chloride, Magnesium Sulfate, Magnesium Chloride, Disodium Phosphate, Monopotassium Phosphate, Calcium Chloride and Sodium Bicarbonate and may also contain Phenol Red or any other suitable indicator and the stable carbohydrates, such as dextrose.

Any of the standard procedures may be used in freeze-drying the mixture of labile components, two examples being: (1) water vapor absorbed at low temperature by a chemical desiccant under vacuum and (2) removal of water vapor by sublimation and mechanical condensation at low temperature.

Freeze-drying a complete medium presents many difficulties. An example is the difficulty in forming a complete desiccated product that would not undergo degradation during the drying process. Moreover, the resulting product may be difficult or impossible to completely restore with water.

The media employed in the laboratories today are generally prepared from stock solutions. These stock solutions must each be stored sterile and some frozen or all frozen. Each stock solution must be adjusted to its proper pH in order to dissolve all the components and to prevent degradation over a protracted period of time. When the culture medium is prepared from a stock solution, additional critical adjustments of pH are necessary.

As practiced in the art today, the adjustment of the pH of the final solution is a long, tedious procedure requiring highly trained technical personnel. The pH must be determined, and a calculation must be made to determine the exact volume of acid or base solution to be added to the culture medium to obtain the desired pH.

We have overcome these difficulties by the use of multiple units (preferably two units) which when added together comprise a complete medium at the pH desired for use. One or more units contain the stable components, and the pH is adjusted to the range of approximately 3 to 8, and preferably 6.0 to 8.0, to compensate for the loss of volatiles, particularly Carbon Dioxide, or any other factors in the preparation of this medium which would affect the pH in the labile components during lyophilization. A suitable indicator, such as Phenol Red, may be added to the stable unit. Phenol Red has a color range between the pH of 5.0 to 8.4, changing gradually in color from yellow in the acid to red in the base. This indicator enables one to determine visually the approximate pH of the final solution and is particularly added to the solution as an aid to the user during the growth of a tissue because a change in color would indicate to the user that a change of culture medium might be necessary.

As previously indicated, the labile components which are not stable in solution and would undergo degradation after a short period of time are prepared by lyophilizing procedures in desiccated form. In the desiccation of the labile components, there is a loss of volatiles, such as Carbon Dioxide or any other factors which might vary the pH of the labile components when reconstituted. For this reason the pH's of the solutions of the labile or stable components may be adjusted or buffered to compensate for the loss of volatiles or any other factors affecting pH. When the culture medium is reconstituted by mixing the stable solution with the desiccated components, the pH of the final solution falls within the proper range, i.e., 6.0 to 8.0, and preferably between 6.8 and 7.6 for media now in common use. However, it is understood that our method can be varied to obtain any final pH that may be needed by users in the field.

For a full understanding of the invention, reference should be had to the accompanying drawings in which FIG. 1 is a perspective view embodying a pair of containers comprising the units of the culture medium preparation in aseptically sealed form and a sterile, double-ended needle and a sterile air vent needle necessary in reconstituting the culture medium, and FIG. 2 is a perspective view illustrating the preparation or reconstitution of the medium by mixing the two units together.

In FIG. 1 we show a suitable container 10 containing the stable solution 12 and aseptically sealed with a pierceable, resilient stopper 20 having a metal cap 16 crimped over the resilient stopper 20 to insure a proper seal. The resilient stopper 20 may be made of any suitable, pierceable, resilient material inert to and unaffected by the culture medium and its components, such as rubber or a suitable synthetic rubber or plastic material or any suitable closure, such as a screw cap closure, may also be used. The stable solution may be prepared by dissolving or mixing the stable components with either saline or water in any desired sequence. They may be mixed in the exact quantity desired and then transferred to container 10.

A second container 10' containing the desiccated labile components 14 and aseptically sealed with a similar pierceable, resilient stopper 20' having a metal cap 16' crimped over the resilient stopper 20' to insure a proper seal is shown in FIG. 1. The resilient stopper 20' may be made of any suitable, pierceable, resilient material inert to and unaffected by the culture medium and its components, such as rubber, or a suitable synthetic rubber or plastic material, or any suitable closure, such as a screw cap, may also be used.

When a container has a closure such as a screw cap, the double-ended needle and air vent needle are not used to aseptically transfer the stable components to the desiccated labile components of our culture medium. All that need be done is to aseptically pour the stable components into the container of the desiccated labile portion.

The labile components are mixed together in the proper sequence following the proper procedures to prevent denaturing and to preserve the sterile character thereof. In this connection it is frequently necessary to separately mix together different groups of components of the culture medium, and these submixtures are thereafter mixed together. The pH is adjusted within the prescribed limits, demineralized water is added thereto to provide the proper dilution. Penicillin, streptomycin and neomycin may be added at this time to combat any contamination from outside sources that may be present in the tissue or that may arise from the handling of the tissue or the culture medium. Any other antibiotic that may be desiccated in the labile components or added to the stable components may be used in place of penicillin, streptomycin and neomycin to perform the same function, i.e., to prevent contamination. At the same time, we also may prefer to add a suitable proteinaceous fluid, such as blood serum, calf's serum, rabbit's serum, human serum, fetal serum, swine's serum, sheep's serum and embryo extracts, which serves among other purposes to help to stabilize the mixture during lyophilization. As a final step, the pH is again checked, and a final adjustment is made if necessary. The mixture is then sterilized as by passing through a bacterial filter, and the proper quantity is placed in sterile container 10. The solution of labile components in the container 10' is then subjected to standard lyophilization procedures, and the container is then suitably sealed, preferably while evacuated although an inert atmosphere, such as nitrogen or helium, may be placed therein. The sealing is preferably accomplished by means of the pierceable, resilient stopper 20', or any suitable closure, such as a screw cap, may be used. The labile components of the culture medium may be stored for a year or more at room temperature without deterioration or degradation and for longer periods of time if subjected to refrigeration.

During lyophilization there is a loss of Carbon Dioxide and other volatiles affecting the pH of the mixture of labile components. To compensate for this loss, we adjust the pH of one or both of the mixtures.

The two units of the culture medium now may be conveniently marketed, shipped and stored together.

To mix or reconstitute the tissue culture medium when container 10' is under vacuum or reduced pressure, a sterile, double-ended needle 18, such as sold under the trademark "Vacutainer," may be used to transfer the solution 12 from container 10 to container 10'. The tabs of the metal caps 16 and 16' are lifted and cotton swabs containing a suitable disinfectant, such as 70% alcohol, are rubbed over the tops of the resilient stoppers 20 and 20' to insure aseptic conditions. The shorter end of the sterile needle 18 is inserted into the resilient stopper 20. Container 10 is inverted and the longer end of the needle 18 is inserted through the resilient stopper 20'. The reduced pressure of container 10' causes the flow of solution 12 into container 10'. An air vent needle 24 inserted in stopper 20 may be used when necessary to complete the transfer from container 10'. When the transfer has been completed, the needle 18 is removed from stopper 20' and the resulting solution 22 is gently rotated to redissolve the desiccated labile components. The resulting solution 22 is the desired culture medium, and it is sterile, at the desired pH of from 6.0 to 8.0, preferably between 6.8 and 7.6 for media now in common use, and ready for use in the growth of cells and tissues in vitro, plastic ware or other suitable vessels. When another closure other than a resilient stopper is used, the contents of container 10 are merely poured into container 10' after removing the aseptically sealed closure. In all cases where this method of reconstitution is used, aseptic techniques are rigidly adhered to.

Specific examples of the preparation and method of preparing a multi unit tissue culture medium pursuant to our invention are as follows:

EXAMPLE 1

*Medium 199* (principally used for maintenance of tissue for virus production in vaccine manufacturing) may be prepared as follows.

*Unit A* containing the the labile components is prepared as follows:

Solution 1

The following chemicals are dissolved in 5 liters of demineralized water:

| | |
|---|---|
| l Arginine _____grams__ | 8.4 |
| l Histidine _____do____ | 2.4 |
| l Lysine _____do____ | 8.4 |
| l Tyrosine _____do____ | 4.8 |
| dl Trypotphan _____do____ | 2.4 |
| dl Phenylalanine _____do____ | 6.0 |
| l Cystine _____grams__ | 2.4 |
| dl Methionine _____do____ | 3.6 |
| dl Serine _____do____ | 6.0 |
| dl Threonine _____do____ | 7.2 |
| dl Leucine _____do____ | 14.4 |
| dl Isoleucine _____do____ | 4.8 |
| dl Valine _____do____ | 6.0 |
| dl Glutamic Acid _____do____ | 18.0 |
| dl Aspartic Acid _____do____ | 7.2 |
| dl Alanine _____do____ | 6.0 |
| l Proline _____do____ | 4.8 |
| l Hydroxyproline _____do____ | 1.2 |
| Glycine _____do____ | 6.0 |
| Cysteine _____mg____ | 12.0 |

Solution 2

The following chemicals are dissolved in 1,000 milliliters of demineralized water:

| | |
|---|---|
| Adenine _____grams__ | 1.2 |
| Guanine _____mg____ | 36.0 |
| Xanthine _____mg____ | 36.0 |
| Hypoxanthine _____mg____ | 36.0 |
| Thymine _____mg____ | 36.0 |
| Uracil _____mg____ | 36.0 |

Solution 3

The following chemicals are dissolved in 1,000 milliliters of demineralized water:

| | Mg. |
|---|---|
| Thiamin _____ | 1.2 |
| Riboflavin _____ | 1.2 |
| Pyridoxine _____ | 3.0 |
| Pyridoxal _____ | 3.0 |
| Niacin _____ | 3.0 |
| Niacinamide _____ | 3.0 |
| Biotin _____ | 1.2 |
| Folic Acid _____ | 1.2 |
| Choline _____ | 60.0 |
| Inositol _____ | 6.0 |
| p-Aminobenzoic Acid _____ | 6.0 |

Solution 4

The following chemicals are dissolved in 1,000 milliliters of demineralized water:

| | Mg. |
|---|---|
| Vitamin A _____ | 12.0 |
| Calciferol (Vit. D) _____ | 12.0 |
| Menadione (Vit. K) _____ | 1.2 |
| alpha-Tocopheryl Phosphate (Vit. E) ____ | 1.2 |
| Ascorbic Acid _____ | 6.0 |
| Glutathione _____ | 6.0 |
| Cholesterol _____ | 24.0 |
| Adenosine Triphosphate _____ | 120.0 |
| Adenylic Acid _____ | 24.0 |
| Ribose _____ | 60.0 |
| Tween 80 _____ | 6.0 |

Solution 5

Dissolve 6 grams of Sodium Acetate in 500 milliliters of demineralized water.

Solution 6

Dissolving 12 mg. of Iron (as Ferric Nitrate) in 100 milliliters of demineralized water.

Solution 7

Dissolve 12 grams of l Glutamine in 1,000 milliliters of demineralized water.

The Solutions 1 through 7 are then combined in a common container, and the pH adjusted to 6.0 by the addition of about 26 milliliters of 5 N Sodium Hydroxide solution. Demineralized water is added to the mixture to give a final volume of 12 liters. To this mixture is added 12 liters of calf serum and 1200 milliliters of Penicillin and Streptomycin solution (10,000 units of each per milliliter). The pH of the mixture will be approximately 7.6. The pH at this point may vary slightly depending on the protein concentration and buffering action of the serum. If a variation from pH 7.6 is found, a further adjustment is made with 1 N Sodium Hydroxide solution or 1 N Hydrochloric Acid. The mixture is Seitz-filtered for sterilization and collected into a sterile container. Aliquots of 21 milliliters are placed in 100-milliliter sterile containers similar to container 10', and the tops of the containers are covered with sterile paper. The containers are frozen at −40° C. and placed on the shelves of a freeze-drying apparatus. The apparatus is evacuated to a pressure of 50 microns of mercury. Water at a temperature of 50° C. is circulated through the shelves and the moisture is condensed on separate plates at a temperature of −40° C. The cycle is completed in 48 hours. The containers are removed from the freeze-dryer, sterile fluted rubber stoppers are placed in the necks of the containers. The containers are evacuated and sealed in a Del-Vac machine, removed and an aluminum cap is crimped over each rubber stopper to insure a proper seal.

*Unit B* containing the stable components may be prepared as follows:

The following chemicals are dissolved in 10 liters of demineralized water:

| | Grams |
|---|---|
| Sodium Chloride | 96.0 |
| Potassium Chloride | 4.8 |
| Magnesium Chloride | 1.2 |
| Disodium Phosphate | 0.72 |
| Monopotassium Phosphate | 0.72 |
| Calcium Chloride | 1.68 |
| Dextrose | 12.0 |
| Phenol Red | 0.24 |
| Sodium Bicarbonate | 4.2 |

The pH of Unit B is adjusted to compensate for the loss of volatile components in Unit A during lyophilization so that upon reconstituting the tissue culture medium, the final pH will be between 6.8 and 7.6. For this purpose the pH is adjusted to 6.3 by the addition of 0.9 milliliters of concentrated Hydrochloric Acid and checking with a pH meter. The final volume of the solution is adjusted to 12 liters by the addition of demineralized water. The solution is Seitz-filtered for sterilization and collected into a sterile container. Aliquots of 100 milliliters are placed in 100-milliliter sterile containers and sterile rubber stoppers are placed in the necks of the containers and covered with aluminum caps. All equipment used is sterile, and aseptic conditions are maintained to prevent contamination of the culture medium.

The two units of the culture medium may be conveniently marketed and shipped. The units may be stored at room temperature and are stable for periods of at least one year and for extended periods of time when refrigerated. The culture medium may be restored at any time ready for use in the growth of cells and tissues in vitro, plastic ware or other suitable containers.

EXAMPLE 2

Melnick's Monkey Kidney "A" may be prepared as follows:

*Unit A* containing the labile components may be prepared as follows:

Five hundred grams of Lactalbumin hydrolysate are dissolved in 6 liters of demineralized water. Ten million units each of Penicillin and Streptomycin are dissolved in 1,000 milliliters of water. The two solutions are combined, and 2,000 milliliters of calf's serum is added. The pH is adjusted to 6.9 by the addition of 61.5 milliliters of Sodium Hydroxide solution. Demineralized water is added to give a final volume of 10 liters. The mixture is passed through Selas filter for sterilization and collected in a sterile container. Under aseptic conditions aliquots of 10 milliliters are placed in 100-milliliter sterile containers and are covered with sterile plastic or metal caps which will permit the passage of water vapor from the frozen sterile solution. The labile mixture is desiccated by lyophilizing procedures as described in Example 1. The containers are stopped in a hydraulic vacuum machine. The air is evacuated, and then the stoplets or Faultless rubber stoppers are forced into place by an internal hydraulic press. The containers are capped with aluminum seals. Any other suitable closure, such as a screw cap closure, may also be used.

*Unit B* containing the stable components may be prepared as follows:

The composition of the balanced salt solution is the same as in Example 1, Unit B.

The pH is adjusted to 6.8 by the addition of 4 milliliters of 5 N Sodium Hydroxide solution. Water is added to give a final volume of 12 liters. The liquid is sterilized by being passed through a Selas filter for sterilization and collected in a sterile container. Aliquots of 100 milliliters are placed in 10-milliliter sterile containers and sterile rubber stoppers are placed in the necks of the containers and covered with aluminum caps.

The two units of the culture medium may be conveniently marketed and shipped. The units may be stored at room temperature and are stable for periods of at least one year and for extended periods of time when refrigerated.

EXAMPLE 3

Basal Eagle Medium may be prepared as follows:

*Unit A* containing the labile components may be prepared as follows:

Solution 1

The following chemicals are dissolved in 8 liters of dimineralized water:

| | Grams |
|---|---|
| l Arginine | 2.0 |
| l Cystine | 1.4 |
| l Histidine | 0.96 |
| l Isoleucine | 3.1 |
| l Leucine | 3.1 |
| l Lysine | 3.5 |
| l Methionine | 0.9 |
| l Phenylalanine | 1.9 |
| l Threonine | 2.9 |
| Tyrosine | 2.2 |
| l Tryptophan | 0.48 |
| Valine | 2.9 |

Solution 2

The following chemicals are dissolved in 1 liter of dimineralized water:

| | Mg. |
|---|---|
| Biotin | 120 |
| Choline | 120 |
| Folic Acid | 120 |
| Calcium Pantothenate | 120 |
| Pyridoxal | 120 |
| Thiamin | 120 |
| Nicotinamide | 120 |
| Riboflavin | 120 |

Solution 3

The following chemical is dissolved in 1 liter of demineralized water:

| | |
|---|---|
| l Glutamine | grams 36 |

Solutions 1 to 3 are combined, and demineralized water is added to give a final volume of 12 liters. To this is added 12 liters of calf's serum and 1200 milliliters of water containing 10,000 units each per milliliter of Penicillin and Streptomycin. This final solution should have a pH of 6.4. Any adjustment of pH can be made with 1 N Sodium Hydroxide or 1 N Hydrochloric Acid. The mixture is sterilized by filtration through a sterile filter assembly of asbestos, glass, porcelain or cellulose using either positive pressure or vacuum, and collected in a sterile container. Aliquots of 21 milliliters are dispensed into 100-milliliter containers. The filling operation is performed under aseptic conditions and samples are removed at random for sterility testing (to insure that the material is free of all contamination). Fluted rubber stoppers are placed in the necks of the containers. The containers are shell frozen by rotation either by hand or mechanical rotator in a mixture of Dry Ice and acetone of alcohol. The mixture of Dry Ice and solvent gives a temperature of −60° C. to −70° C. The shell freezing may also be accomplished by rotation in a freezer at −40° C. (the containers are rotated on an inclined rotator to freeze the liquid on the sides as well as the bottoms of the containers). The containers are placed in a freeze-dryer apparatus, the chamber is evacuated and the moisture is condensed on refrigerated plates at −40° C. The moisture is forced out of the frozen material by circulation of hot liquid through the shelves which support the containers. After 48 hours a plate within the freeze-dryer apparatus is lowered to seal the fluted stoppers under their original vacuum or the chamber is filled with an inert gas such as nitrogen, and the stoppers are sealed in place. The containers are removed from the chamber, and aluminum caps seal the rubber stoppers in place.

Samples are again taken for sterility testing and also toxicity studies (ability to maintain cells in a viable state).

*Unit B* containing the stable components may be prepared as follows:

The following chemicals are dissolved in 10 liters of demineralized water:

| | Grams |
|---|---|
| Sodium Chloride | 81.6 |
| Potassium Chloride | 4.8 |
| Magnesium Chloride | 0.96 |
| Calcium Chloride | 2.4 |
| Monosodium Phosphate | 1.68 |
| Dextrose | 12.0 |
| Sodium Bicarbonate | 20.0 |

To this is added 6 milliliters of 1% Phenol Red solution. The pH is adjusted or buffered to 6.8 by the addition of about 1.3 milliliters of concentrated Hydrochloric Acid so that when the culture medium is restored, the final pH will be within the desired range. Demineralized water is added to give a final volume of 12 liters. The mixture is filter sterilized and aliquots of 100 milliliters are dispensed in 100-milliliter containers under aseptic conditions. Sterile rubber stoppers are placed in the necks of the containers and covered with aluminum caps. Samples of this material are taken for sterility and toxicity testing.

The two units of the culture medium may be conveniently marketed and shipped.

The units may be stored at room temperature and are stable for periods of at least one year and for extended periods of time when refrigerated. The units are ready for use and when reconstituted as described previously, the medium will have the desired pH.

In performing the above examples, penicillin and streptomycin were used as an antibiotic. Neomycin or any other antibiotic that may be desiccated in the labile components or added to the stable components may be used in place of penicillin and streptomycin to perform the same function, i.e., to prevent contamination and combat any contamination that may be present in the tissue from outside sources or that may arise from the handling of the tissue or the culture medium.

It will be appreciated that modification may be made in the illustrative embodiments and examples of our invention within the scope of the appended clams. Thus, other issue culture media may be prepared in multi-unit form in the manner described herein by preparing one or more units from the stable components in the form of a solution and the other unit or units from the labile components following the proper techniques to prevent the denaturing thereof, and then lyophilizing them in the general manner disclosed herein. Also, the specific type of container and the procedure for reconstituting the culture medium may be varied.

We claim:

1. A complete tissue culture preparation having a stable aqueous component and a stable dry component in which the components are rapidly reconstituted for immediate use as media for culturing tissue in vitro, said dry component being aseptically sealed and having a uniformly distributed mixture of labile ingredients of a tissue culture preparation including at least amino acid, antibiotic, vitamin, and having serum uniformly and intimately mixed therein, said dry mixture being in lyophilized form, said lyophilized mixture having volatile buffering components removed therefrom during lyophilization, said mixture having an initial pH of between 3.0 and 8.0, said aqueous component being comprised of a stable balanced buffered salt solution of inorganic material and stable carbohydrate aseptically sealed and having an initial pH of between 3.0 and 8.0, one of said components compensating for the loss of said volatile buffering components so that the ultimate pH is between 6.0 and 8.0 when said tissue culture preparation is restored, and connecting means for connecting the aseptically sealed dry component with the aseptically sealed aqueous component for reconstituting the components by mixing the components together.

2. A complete tissue culture preparation as set forth in claim 1 in which the uniformly distributed mixture of labile components also includes l-glutamine.

3. A complete tissue culture preparation as set forth in claim 1 in which said antibiotic includes material selected from the group consisting of penicillin, streptomycin, and neomycin.

4. A complete tissue culture preparation as set forth in claim 1 in which the aqueous component also includes a pH indicator.

5. A method of preparing a complete tissue culture preparation having a pH of from 6–8 comprising reconstituting by mixing together a stable aqueous mixture and a stable dry mixture whereby the mixtures are rapidly reconstituted for immediate use as media for culturing tissue in vitro, said dry mixture having an initial pH of between 3.0 and 8.0, being lyophilized, aseptically sealed and having uniformly distributed labile ingredients of a tissue culture preparation including amino acid, antibiotic, vitamin and also having serum uniformly and intimately mixed therein, said dry mixture having volatile buffering components removed during lyophilization; and the aqueous mixture being comprised of a stable, aseptically sealed solution having a pH of between 3.0 and 8.0 and including a balanced buffered salt solution of inorganic salts and stable carbohydrate.

6. The method of claim 5 wherein the dry mixture contains added buffers to maintain the pH of the reconstituted mixture at a pH of 6.0 to 8.0 and thereby compensate for the loss of volatile buffering components lost during lyophilization.

7. The method of claim 5 wherein the uniformly distributed labile ingredients also include l-glutamide.

8. The method of claim 5 wherein said antibiotic includes material selected from the group consisting of penicillin, streptomycin and neomycin.

9. The method of claim 5 wherein the aqueous mixture also includes a pH indicator.

References Cited by the Examiner

UNITED STATES PATENTS

| | | | |
|---|---|---|---|
| 2,149,304 | 3/1939 | Masucci | 167—78 |
| 2,176,041 | 10/1939 | Pittenger | 167—78 |
| 2,552,360 | 5/1951 | Zichis | 167—78 |
| 3,024,167 | 3/1962 | Damaskus | 167—65 |

FOREIGN PATENTS 798,147   7/1958   Great Britain.

OTHER REFERENCES

Swim: J. Lab. and Clin. Med., volume 52, August 1958, pages 309–311.

Difco: Reagents and Media for Tissue Culture and Virus Propagation, April 1955, 20 pages.

JULIAN S. LEVITT, *Primary Examiner.*

MORRIS O. WOLK, *Examiner.*

D. LEVY, A. P. FAGELSON, S. ROSEN,
*Assistant Examiners.*